United States Patent [19]
Wagner

[11] Patent Number: 5,365,855
[45] Date of Patent: Nov. 22, 1994

[54] TRACK FOR MAGNETIC LEVITATION TRAINS WITH STATOR CONNECTION HAVING SHEAR LOADED BELTS

[75] Inventor: Peter Wagner, Dortmund, Germany

[73] Assignee: Thyssen Industrie AG, Essen, Germany

[21] Appl. No.: 74,741

[22] Filed: Jun. 10, 1993

[30] Foreign Application Priority Data

Jun. 12, 1992 [DE] Germany .................. 4219199

[51] Int. Cl.$^5$ .............................. B60L 13/04
[52] U.S. Cl. .................... 104/124; 104/281
[58] Field of Search ............. 104/124, 111, 281, 286; 403/205, 270, 337

[56] References Cited

U.S. PATENT DOCUMENTS

| | | | |
|---|---|---|---|
| 1,569,060 | 1/1926 | Wright | 104/111 |
| 4,064,808 | 12/1977 | Nakamura et al. | 104/281 X |
| 4,696,235 | 9/1987 | Wagner | 104/124 |
| 4,698,895 | 10/1987 | Miller et al. | 104/281 X |
| 5,097,769 | 3/1992 | Raschbichler | 104/124 |
| 5,131,132 | 7/1992 | Kindmann et al. | 104/124 X |

FOREIGN PATENT DOCUMENTS

| | | | |
|---|---|---|---|
| 2914907 | 10/1980 | Germany | 104/124 |
| 4143301 | 5/1992 | Japan | 104/281 |

*Primary Examiner*—Robert J. Oberleitner
*Assistant Examiner*—S. Joseph Morano
*Attorney, Agent, or Firm*—McGlew and Tuttle

[57] ABSTRACT

A track for magnetic levitation trains with a track support beam (1), which has lateral side guide rails (3) at its longitudinal edges and crossbeams (4) extending between these rails, as well as longitudinal beams (5) connecting the crossbeams (4), wherein connection parts (7) for fastening the stator plates are connected with bolt connections to the crossbeams (4) and/or the longitudinal beams (5). A track, which can be manufactured economically, can be easily installed, and this also makes it possible to transmit the vertical loads occurring during the train operation in a reliable and long-term, serviceable manner, is characterized in that the connection parts (7) are designed as grooved crossbars of the stator plates (6), which extend in parallel to the crossbeams (4) and are connected to the track support beam (1) with nonsliding bolt connections (11, 15), in which the forces are transmitted at right angles to the longitudinal axis of the bolt.

11 Claims, 2 Drawing Sheets

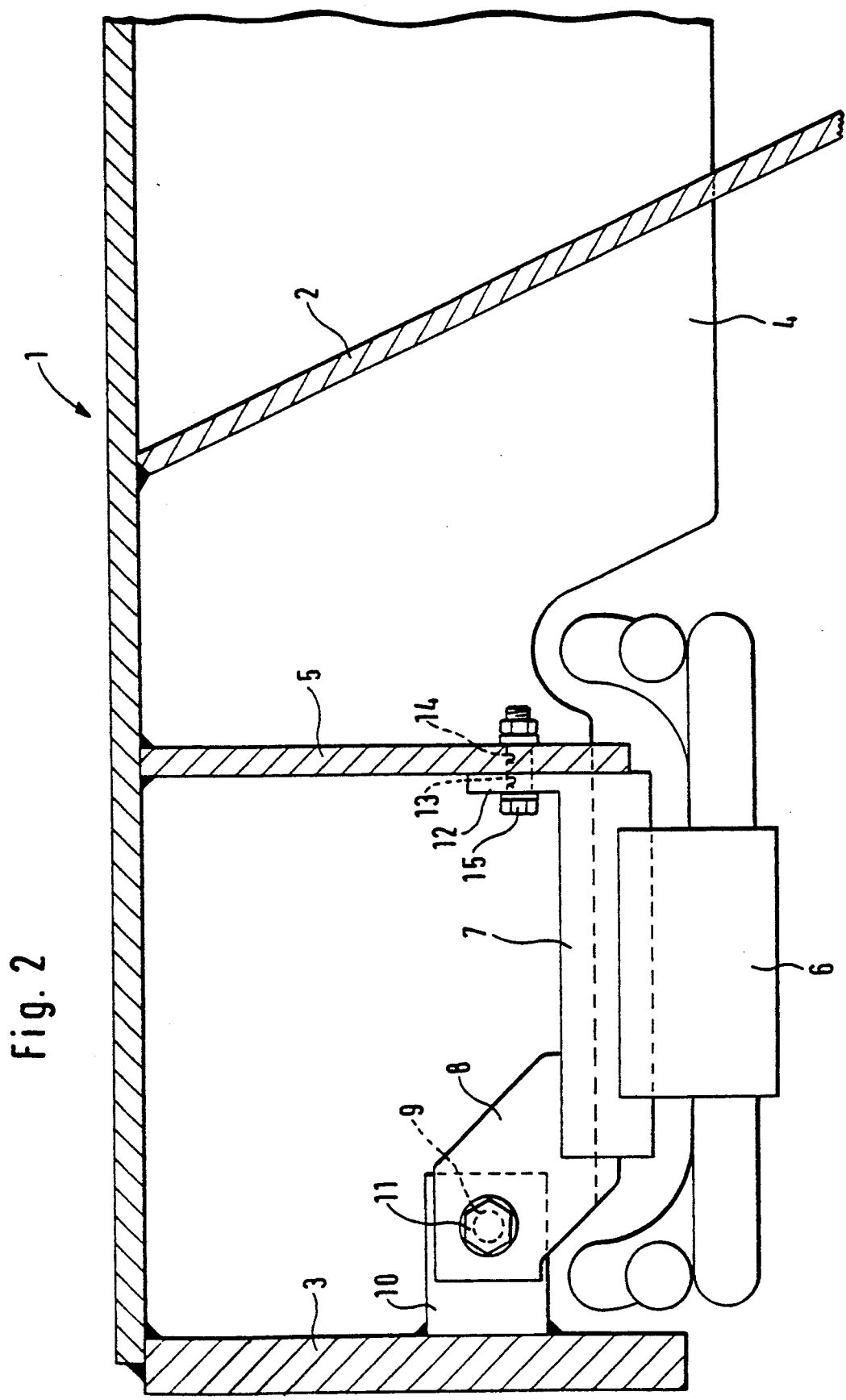

TRACK FOR MAGNETIC LEVITATION TRAINS WITH STATOR CONNECTION HAVING SHEAR LOADED BELTS

FIELD OF THE INVENTION

The present invention pertains to a track for magnetic levitation trains with a track support beam, which has lateral side guide rails at its longitudinal edges and crossbeams extending between these, as well as longitudinal beams connecting the crossbeams, wherein connection parts for fastening the stator plates are connected with bolt connections to the crossbeams and/or the longitudinal beams.

BACKGROUND OF THE INVENTION

The connection parts are of a T-shaped design in a prior-art track of this type (German Patent No. DE-PS 34 12 401 corresponding to U.S. Pat. No. 4,696,235). They are connected with their T-web to longitudinal beams or crossbeams by means of bolt connections, whose bolt longitudinal axes extend essentially in parallel to the plane of the track. The stator plates are connected to the T-beam with bolts, whose longitudinal axes extend at right angles to the track, i.e., vertically. The forces acting during the operation of the stator plates, especially the weight of the magnetic levitation train, must be transmitted by these vertically directed bolts. These bolts are relatively short in the prior-art design. Since damage occurred in practice, a change was made to fastening the stator plates with longer bolts, which were turned into associated threaded holes of the track support beam. This requires a very expensive reworking of the track support beam, as well as a considerable expense for turning in and pretensioning the bolts, because a reduction of the pretensioning force would ultimately lead to the bolt becoming detached from its threaded hole under the dynamic stresses and no longer being able to assume its supporting function.

SUMMARY AND OBJECTS OF THE INVENTION

The primary object of the present invention is to provide a track of the type described in the introduction, which makes possible the reliable and long-term, serviceable transmission of the vertical loads during the train operation, along with economical manufacture and simple installation, especially of the stator plates on the connection parts.

This object is attained by designing the connection parts as grooved crossbars of the stator plates, which extend in parallel to the plane of the crossbeams and are connected to the track support beams with nonsliding bolt connections, in which the forces are transmitted at right angles to the longitudinal axes of the bolts. In particular, the longitudinal axes of the bolts shall be directed in parallel to the plane of the track. This facilitates the manufacture of the track, because only through holes for the bolts need be prepared on the longitudinal beams and/or crossbeams as well as on the grooved crossbars of the stator plates. Furthermore, it is possible to use standardized, high-strength bolts with relatively short grips, which can be pretensioned in a simple manner even according to conventional pretensioning methods. The vertical loads are transmitted mainly by frictional forces between the components braced with one another.

According to the present invention, the connection parts should also be connected to the crossbeams on at least one side. They may also be connected to the crossbeams on both sides. The connection parts may also be connected to the longitudinal beams on at least one side with a bend parallel to the plane of the longitudinal beams.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a detail view from the object according to FIG. 1 on a larger scale.

DETAILED DESCRIPTION OF THE PREFERRED EMBODIMENT

Figure 1:
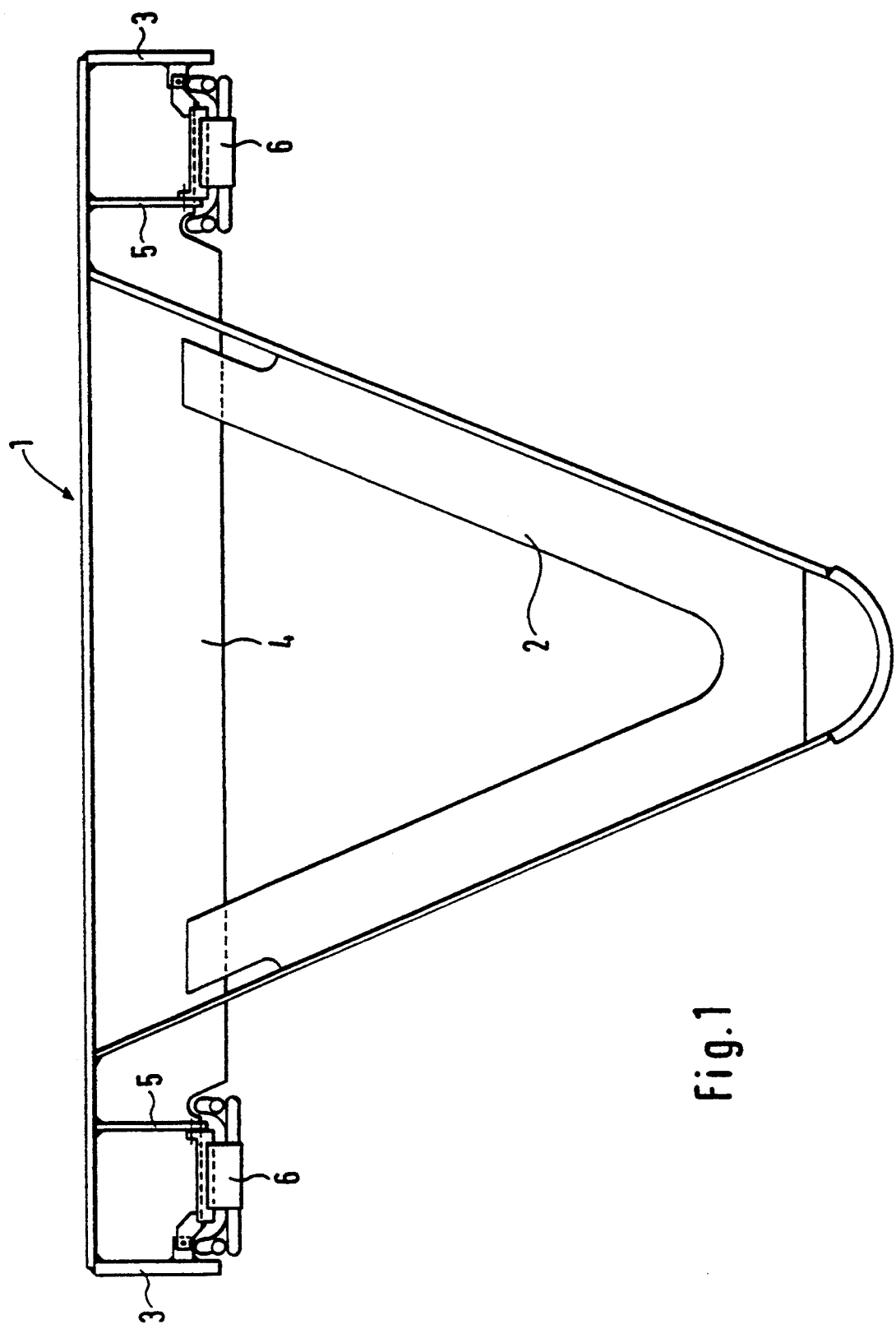
FIG. 1 is a schematic cross sectional view taken through a track for magnetic levitation trains.

The track shown in the drawing for a magnetic levitation train consists, in its basic design, a steel and/or concrete track support beam 1, which is supported on V-shaped supports 2. The track support beam 1 has lateral side guide rails 3, which are connected by crossbeams 4. Furthermore, longitudinal beams 5 connecting the crossbeams 4 are provided. Stator plates 6 are attached to the track support beam on the inside next to the side guide rails 3. These stator plates have a grooved crossbar 7, which extends in parallel to the plane of the crossbeams 4 and is used to connect the stator plates 6 to the track support beam 1. In the embodiment shown, the grooved crossbar 7 has a welded-on terminal lug 8 at its end that is the left-hand end in FIG. 2. The terminal lug 8 has a through hole 9, which can be brought to coincide with another through hole in the crossbeam 4 as well as with a reinforcement 10 provided thereon for introducing a bolt 11. This forms a first connection means.

Furthermore, at its end that is the right-hand end in FIG. 2, the grooved crossbar has a bend 12, which extends in parallel to the plane of the longitudinal beam 5 and also has a longitudinal through hole 13, which is brought to coincide with an associated through hole 14 of the longitudinal beam 5 in order for a bolt 15 to be able to be introduced. This forms a second connection means.

The bolts 11, 12 are pretensioned in the conventional manner to the extent that the vertical forces acting on the stator plates 6 will be transmitted by friction between the components 8 and 10 as well as 5 and 12.

While a specific embodiment of the invention has been shown and described in detail to illustrate the application of the principles of the invention, it will be understood that the invention may be embodied otherwise without departing from such principles.

What is claimed is:

1. A track for magnetic levitation trains, the track comprising:
   a track support beam having a lateral side;
   a cross beam extending substantially perpendicular from said track support beam and substantially perpendicular from said lateral side of said track support beam;

a longitudinal beam extending substantially perpendicular from said cross beam and substantially perpendicular from said track support beam;

a stator plate positioned between said lateral side of said track support beam and said longitudinal beam, said stator plate being substantially perpendicularly spaced from said track support beam, said stator receiving a force from the magnetic levitation trains, which is substantially perpendicular to said track support beam;

first connection means for connecting said stator plate to said cross beam, said first connection means including a cross beam bolt extending through said cross beam, said cross beam bolt having a longitudinal axis substantially perpendicular to and supporting a portion of said force of said stator plate;

second connection means for connecting said stator plate to said longitudinal beam, said second connection means including a longitudinal beam bolt extending through said longitudinal beam, said longitudinal beam bolt having a longitudinal axis substantially perpendicular to and supporting a remainder of said force of said stator plate.

2. A track according to claim 1, wherein:
said longitudinal axis of said cross beam bolt and said longitudinal beam bolt are directed in parallel to a plane of said track.

3. A track according to claim 1, wherein:
said grooved cross bar are connected to said cross beam on at least one side.

4. A track according to claim 1, wherein:
said second connection means includes a bend formed parallel to a plane of said longitudinal beams.

5. A track in accordance with claim 1, wherein:
said stator plate includes a grooved cross bar extending parallel to said cross beam;
said first connection means further includes a terminal lug connected to said grooved cross bar and extending substantially perpendicular to and toward said track support beam, said terminal lug being positioned substantially parallel to and adjacent to said cross beam;
said second connection means further including a longitudinal bend connected to said grooved cross bar and extending substantially perpendicular to and toward said track support beam, said longitudinal bend being positioned substantially parallel to and adjacent to said longitudinal beam.

6. A track in accordance with claim 1, wherein:
said terminal lug is welded to said grooved cross bar;
said longitudinal bend is an integral part of said grooved cross bar.

7. A track in accordance with claim 1, wherein:
said track support beam is positioned in a substantially horizontal track plane;
said cross beam extends substantially vertically downward from said track support beam;
said longitudinal beam extends substantially vertically downward from said track support beam;
said stator plate is positioned substantially vertically downward from said track support beam, and said force on said stator is substantially downward.

8. A track in accordance with claim 1, further comprising:

a support extending from said track support beam at a side and at a position spaced from said lateral side of track support beam, said track support beam having a portion between said lateral side and said support;

said cross beam extending from said side of said portion of said track support beam;

said longitudinal beam extending from said side of said portion of said track support beam;

said stator plate being substantially perpendicularly spaced from said side of said portion of said track support beam.

9. A track for magnetic levitation trains, the track comprising:

a support;

a track support beam having substantially opposite first and second sides, said support extending from said first side of said track support beam, said track support beam having a portion extending outward from said support and being positioned in a substantially horizontal track plane;

a guide rail positioned at a longitudinal edge of said track support beam and extending substantially vertically downward from said first side of said portion of said track support beam;

a cross beam extending substantially perpendicular to said guide rail and extending substantially vertically downward from said first side of said portion of said track support beam;

a longitudinal beam extending substantially parallel to and spaced from said guide rail, said longitudinal beam extending substantially perpendicular to said cross beam and substantially vertically downward from said first side of said portion of said track support beam;

a stator plate positioned between said guide rail and said longitudinal beam, and positioned substantially vertically downward from said first side of said portion of said track support beam, said stator plate including a grooved cross bar extending parallel to said cross beam, said stator receiving substantially vertically downward force from the magnetic levitation trains;

a terminal lug connected to said grooved cross bar and extending substantially upward from said grooved bar, said terminal lug being substantially parallel to and adjacent to said cross beam;

a cross beam bolt extending through said cross beam and said terminal lug, said cross beam bolt having a longitudinal axis substantially horizontal and supporting a portion of said substantially vertical downward force of said stator plate;

a longitudinal bend connected to said grooved cross bar and extending substantially upward from said grooved bar, substantially parallel to and adjacent to said longitudinal beam;

a longitudinal beam bolt extending through said longitudinal beam and said longitudinal bend, said longitudinal beam bolt having a longitudinal axis substantially horizontal and supporting a portion of said substantially vertical downward force of said stator plate.

10. A track in accordance with claim 9, further comprising:
another cross beam similar to said cross beam and spaced from said cross beam:
said stator plate being positioned between said cross beam and said another cross beam;

another terminal lug connected to said grooved cross bar and extending substantially upward from said grooved bar, said another terminal lug being substantially parallel to and adjacent to said another cross beam;

another cross beam bolt extending through said another cross beam and said another terminal lug, said another cross beam bolt having a longitudinal axis substantially horizontal and supporting a remainder of said substantially vertical downward force of said stator plate.

11. A track for magnetic levitation trains, the track comprising:

a track support beam having a lateral side;

a cross beam extending substantially perpendicular from said track support beam and substantially perpendicular from said lateral side of said track support beam;

a longitudinal beam extending substantially perpendicular from said cross beam and substantially perpendicular from said track support beam;

a stator plate positioned between said lateral side of said track support beam and said longitudinal beam, said stator plate being substantially perpendicularly spaced from said track support beam, said stator receiving a force from the magnetic levitation trains, which is substantially perpendicular to said track support beam;

a reinforcement extending substantially perpendicular from said lateral side of said track support beam, said reinforcement defining a hole;

first connection means for connecting said stator plate to said reinforcement, said first connection means including a cross beam bolt extending through said hole in said reinforcement, said cross beam bolt having a longitudinal axis substantially perpendicular to and supporting a portion of said force of said stator plate;

second connection means for connecting said stator plate to said longitudinal beam, said second connection means including a longitudinal beam bolt extending through said longitudinal beam, said longitudinal beam bolt having a longitudinal axis substantially perpendicular to and supporting a remainder of said force of said stator plate.

* * * * *